US012661601B2

(12) United States Patent
Wadsworth et al.

(10) Patent No.: US 12,661,601 B2
(45) Date of Patent: Jun. 23, 2026

(54) SHOW EFFECT SYSTEM FOR ATTRACTION SYSTEM

(71) Applicant: Universal City Studios LLC, Universal City, CA (US)

(72) Inventors: Michael Lee Wadsworth, Orlando, FL (US); Darrin Hughes, Orlando, FL (US); Timothy J. Eck, Windermere, FL (US)

(73) Assignee: Universal City Studios LLC, Universal City, CA (US)

( * ) Notice: Subject to any disclaimer, the term of this patent is extended or adjusted under 35 U.S.C. 154(b) by 667 days.

(21) Appl. No.: 17/846,530

(22) Filed: Jun. 22, 2022

(65) Prior Publication Data

US 2023/0330556 A1      Oct. 19, 2023

Related U.S. Application Data

(60) Provisional application No. 63/332,115, filed on Apr. 18, 2022.

(51) Int. Cl.
*A63J 1/00*        (2006.01)
*A63G 31/00*       (2006.01)
(Continued)

(52) U.S. Cl.
CPC .............. *A63J 19/006* (2013.01); *A63J 1/00* (2013.01); *B25J 11/004* (2013.01); *A63G 31/00* (2013.01)

(58) Field of Classification Search
CPC ... A63J 1/00; A63J 1/02; A63J 19/006; A63G 31/00; B25J 11/003; B25J 11/004
(Continued)

(56) References Cited

U.S. PATENT DOCUMENTS

| | | | | |
|---|---|---|---|---|
| 1,090,706 A | * | 3/1914 | Goolman | .................. G10F 5/02 |
| | | | | 84/118 |
| 3,024,551 A | * | 3/1962 | Oppenheim | ............ G09F 11/23 |
| | | | | 446/361 |

(Continued)

FOREIGN PATENT DOCUMENTS

| | | | | |
|---|---|---|---|---|
| CN | 201429976 Y | * | 3/2010 | |
| CN | 205660736 U | * | 10/2016 | |

(Continued)

OTHER PUBLICATIONS

PCT/US2023/018943 International Search Report and Written Opinion mailed Jul. 17, 2023.

(Continued)

*Primary Examiner* — Alexander R Niconovich
(74) *Attorney, Agent, or Firm* — Fletcher Yoder, PC

(57) ABSTRACT

A show effect system of an amusement park attraction includes a prop component and a linkage system having an extension and a contactor system. The linkage system is configured to move relative to the prop component to move the extension toward the prop component and to cause engagement between the contactor system and the prop component, cause the prop component to move, via the engagement between the contactor system and the prop component, in conjunction with the extension, and block direct contact between the prop component and the extension. The extension is coupled to an animated figure such that the linkage system is configured to cause movement of the animated figure via the extension.

20 Claims, 6 Drawing Sheets

(51) Int. Cl.
*A63J 19/00* (2006.01)
*B25J 11/00* (2006.01)

(58) Field of Classification Search
USPC .......................................... 472/75–84, 57, 70
See application file for complete search history.

(56) References Cited

U.S. PATENT DOCUMENTS

| | | | | |
|---|---|---|---|---|
| 5,685,778 | A * | 11/1997 | Sheldon | A63G 7/00 472/43 |
| 7,238,079 | B2 * | 7/2007 | Madhani | B62D 57/032 446/377 |
| 7,433,760 | B2 * | 10/2008 | Alvarez | G06T 13/00 348/E5.022 |
| 7,712,640 | B2 * | 5/2010 | Honer | G09B 23/28 223/66 |
| 7,791,608 | B2 * | 9/2010 | Henson | G06T 13/40 345/473 |
| 8,517,788 | B2 * | 8/2013 | Eck | A63H 13/00 446/175 |
| 8,633,933 | B2 * | 1/2014 | Henson | G06T 13/00 345/473 |
| 8,761,927 | B2 * | 6/2014 | Johnson | B25J 17/0266 901/23 |
| 9,017,178 | B2 * | 4/2015 | Jackson | A63J 5/12 472/75 |
| 9,278,292 | B2 * | 3/2016 | Vance | A63G 1/02 |
| 10,688,401 | B1 * | 6/2020 | Brister | B61F 5/52 |
| 10,778,955 | B2 | 9/2020 | Nolan et al. | |
| 12,502,621 | B2 * | 12/2025 | Wadsworth | A63J 19/00 |
| 2009/0057636 | A1 * | 3/2009 | Davis | A63J 1/02 254/89 H |
| 2015/0087431 | A1 | 3/2015 | Jackson | |
| 2015/0352452 | A1 | 12/2015 | Vance et al. | |
| 2020/0222824 | A1 * | 7/2020 | Temple, Jr. | A63J 19/006 |
| 2020/0262085 | A1 * | 8/2020 | Temple, Jr. | A63J 7/005 |
| 2023/0311011 | A1 * | 10/2023 | Zebleckes | A63G 31/16 472/59 |
| 2024/0001255 | A1 * | 1/2024 | Wadsworth | A63J 19/00 |
| 2024/0181638 | A1 * | 6/2024 | Sun | B25J 13/003 |
| 2025/0010468 | A1 * | 1/2025 | Cho | B25J 9/163 |
| 2025/0073605 | A1 * | 3/2025 | Niecestro | A63G 31/02 |
| 2025/0367571 | A1 * | 12/2025 | Eck | A63G 31/00 |

FOREIGN PATENT DOCUMENTS

| | | | | |
|---|---|---|---|---|
| CN | 107253200 | B * | 5/2019 | B25J 11/004 |
| CN | 209273452 | U * | 8/2019 | |
| WO | WO-2024054379 | A1 * | 3/2024 | A63G 7/00 |

OTHER PUBLICATIONS

Magicpedia, "Black Art", Aug. 3, 2014, 1 page, https://geniimagazine.com/wiki/index.php?title=Black_art.

Howell, Christopher, "Types of Magicians", Oct. 15, 2019, 24 pages, London, https://christopherhowell.net/types-of-magicians.

Popcorn, "America's Got Talent 2017 Visualist Will Tsai Unbelievable Sleight of Hand Full Audition S12E01", YouTube, May 31, 2017, 7:41 minutes, 1 page, https://www.youtube.com/watch?v=OPtEFoagU98.

Hans Klok Official, "Hans Klok—Black Art", YouTube, Dec. 22, 2015, 2:40 minutes, 1 page, https://www.youtube.com/watch?v=Hp-eut7a0eA.

Best Magic and Magical Acts, "Omar Pasha performs his Black Art Magic Act 1982", YouTube, Jul. 18, 2020, 8:32 minutes, 1 page, https://www.youtube.com/watch?v=CsZLzY6LWbg.

NixPix, "Sonny Eclipse—Cosmic Ray's Starlight Cafe—Tomorrowland—Magic Kingdom", YouTube, Feb. 6, 2018, 19:42 minutes, 1 page, https://www.youtube.com/watch?v=xPfJhU-5ScQ.

Fussell, Sidney, "Shanghai Disney's new 'Pirates of the Caribbean' ride looks incredible", Business Insider, May 11, 2016, 12 pages, https://www.businessinsider.com/awesome-pirates-of-the-caribbean-ride-2016-5.

Adafruit, "Robot Archaeology: Chuck E Cheese and Showbiz Pizza Animatronics #MakeRobotFriend #robots @adafruit", May 10, 2018, 9 pages, https://blog.adafruit.com/2018/05/10/robot-archeology-chuck-e-cheese-and-showbiz-pizza-animatronics-makerobotfriend-robots-adafruit/.

* cited by examiner

SHOW EFFECT SYSTEM FOR ATTRACTION SYSTEM

CROSS-REFERENCE TO RELATED APPLICATION

This application claims priority to and the benefit of U.S. Provisional Application No. 63/332,115, entitled "SHOW EFFECT SYSTEM FOR ATTRACTION SYSTEM," filed Apr. 18, 2022, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Throughout amusement parks and other entertainment venues, special effects can be used to help immerse guests in the experience of a ride or attraction. Immersive environments may include three-dimensional (3D) props and set pieces, robotic or mechanical elements, and/or display surfaces that present media. In addition, the immersive environment may include audio effects, smoke effects, and/or motion effects. Thus, immersive environments may include a combination of dynamic and static elements. With the increasing sophistication and complexity of modern ride attractions and the corresponding increase in expectations among theme or amusement park patrons, improved and more creative attractions are desirable, including ride attractions having more complex, immersive, and/or realistic special effects.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a show effect system of an amusement park attraction includes a prop component and a linkage system having an extension and a contactor system. The linkage system is configured to move relative to the prop component to move the extension toward the prop component and to cause engagement between the contactor system and the prop component, cause the prop component to move, via the engagement between the contactor system and the prop component, in conjunction with the extension, and block direct contact between the prop component and the extension.

In an embodiment, an attraction system of an amusement park includes a component comprising a first section and a second section, an extension, an animated figure coupled to the extension, a contactor system, and a support coupled to the extension and to the contactor system. The support is configured to move relative to the component to move the extension and the animated figure toward the first section of the component until the contactor system engages the second section of the component and move while the contactor system is in engagement with the second section of the component to cause concurrent movement of the component and the animated figure to avoid direct contact between the component and the animated figure.

In an embodiment, a method includes moving, via movement of a linkage system coupled to an animated figure and having a contactor system, the animated figure toward a movable component of an attraction system, engaging, via the movement of the linkage system, the contactor system with the movable component, and causing, via the movement of the linkage system during engagement between the contactor system and the movable component, movement of the movable component in conjunction with movement of the animated figure to block direct contact between the animated figure and the movable component.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
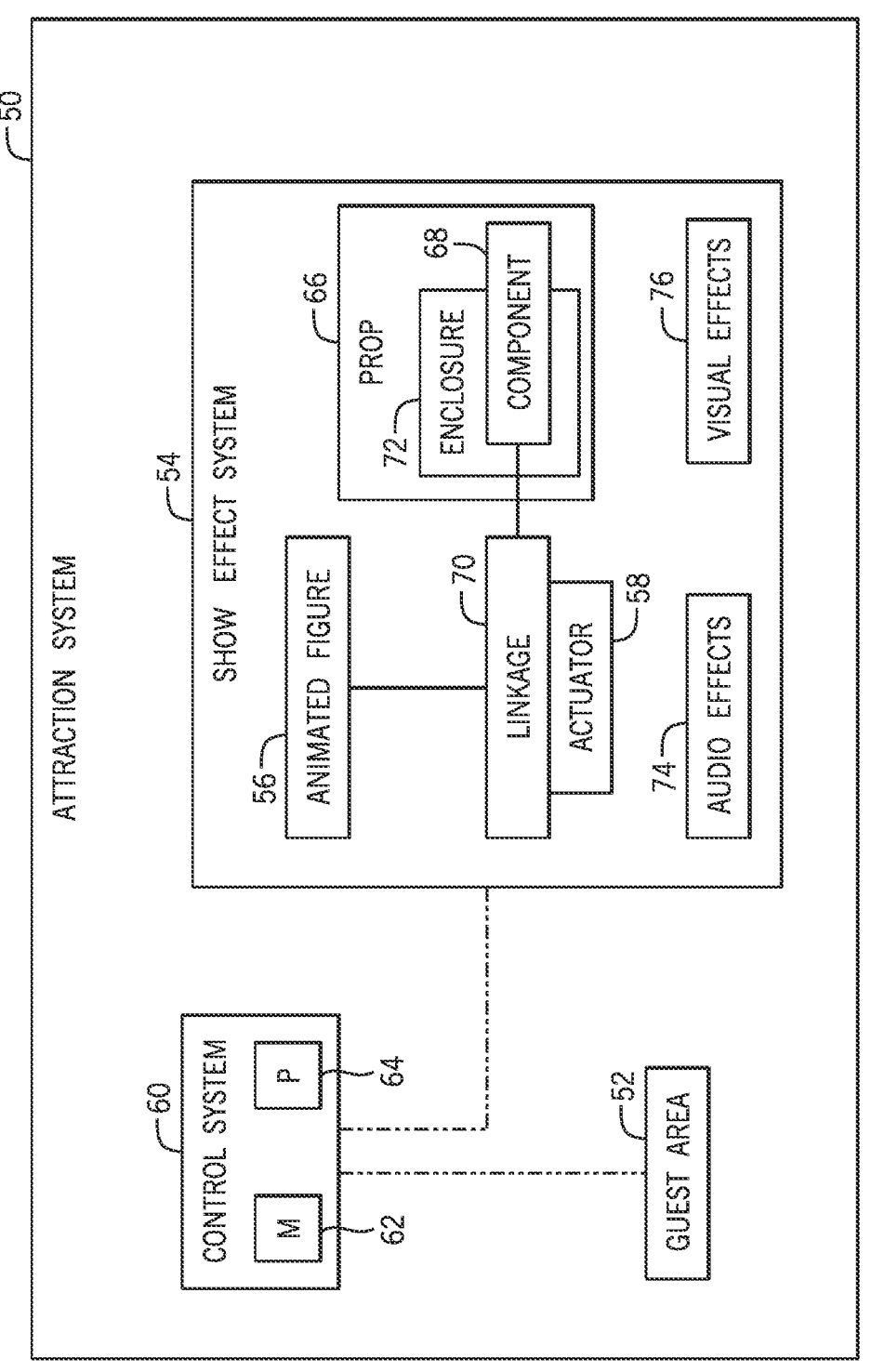
FIG. 1 is a schematic diagram of an embodiment of an attraction system, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to providing show effects for an amusement or theme park. The amusement park may include a variety of features, such as rides (e.g., a roller coaster), theatrical shows, set designs, performers, and/or decoration elements, to entertain guests. Show effects may be used to supplement or complement the features, such as to provide the guests with a more immersive and/or unique experience. For example, the show effects may be presented to emulate real world elements in order to present a more realistic atmosphere for the guests and/or create otherworldly (e.g., fantastical, fanciful, magical, fictional, supernatural) effects, atmospheres, or elements. In certain systems, tangible show effect elements may be arranged to physically contact one another to cause certain movement of the show effect elements that are observable by the guests to provide a desirable show effect, such as to provide a storytelling narrative to the guests. Unfortunately, such contact may cause fatigue, wear, and/or deterioration of the show effect elements. As a result, there may be an increased cost associated with maintaining the show effect elements, such as to replace and/or repair the show effect elements.

Therefore, it is presently recognized that operation of a show effect system to provide an illusion or appearance that show effect elements physically contact one another to drive movement of the show effect elements without placing the show effect elements in direct contact with one another may provide a desirable show effect while reducing a cost associated with operation and/or maintenance of the attraction system. Accordingly, embodiments of the present disclosure are directed to an attraction system that includes a show effect system configured to portray movement of a prop caused by an animated figure via a linkage system. For example, the linkage system may be configured to move the prop and the animated figure. The linkage system may be coupled to the animated figure (e.g., a hand of the animated figure), and movement of the linkage system may cause movement of a part of the animated figure. Furthermore, the linkage system may be configured to engage the prop to impart a force that causes movement of the prop. In an embodiment, the linkage system may be configured to move in a first direction to move the part of the animated figure toward the prop and position the part of the animated figure adjacent to the prop. The movement of the linkage system in the first direction may also cause the linkage system to engage the prop. Further movement of the linkage system (e.g., in the first direction) while in engagement with the prop may increase the force imparted on the prop to cause the prop to move in conjunction with movement of the animated figure. That is, the prop and the part of the animated figure positioned adjacent to the prop may move with one another, thereby avoiding direct contact between the prop and the animated figure.

In addition, movement of the linkage system in a second direction, which may be opposite the first direction, may move the part of the animated figure while reducing the force imparted on the prop to cause additional movement of the prop. In this manner, movement of the linkage system in the second direction may cause movement of the prop in conjunction with movement of the animated figure to block contact between the prop and the animated figure. Further movement of the linkage system in the second direction may disengage the linkage system from the prop, and the linkage system may not cause movement of the prop while disengaged from the prop. However, movement of the linkage system (e.g., in the second direction) while disengaged from the prop may cause movement of the animated figure, such as in a direction farther away from the prop.

The positioning of the animated figure with respect to the prop may be visible to the guests. For example, the guests may see the part of the animated figure approaching the proximity of the prop and moving in conjunction with the prop. However, the engagement between the linkage system and the prop, as well as the coupling between the linkage system and the animated figure, may be obscured and may not be noticeable to the guests. Thus, the guests may not see that the linkage system, rather than the animated figure, is causing the prop to move. Instead, since the part of the animated figure is adjacent to the prop and is moving with the prop, the guests may perceive that the part of the animated figure is causing the prop to move. That is, it may appear that the animated figure is contacting and imparting a force onto the prop to cause movement of the prop to provide an illusion that the animated figure is directly touching the prop. In this manner, the guests may see a realistic appearance in which the animated figure appears to be interacting with the prop without usage of the linkage system. However, since the linkage system may block contact between the animated figure and the prop, the linkage system may reduce (e.g., prevent) wear of the show effect system (e.g., of the animated figure, of the prop) that would otherwise be caused by contact between the animated figure and the prop and that would potentially be visible to the guests. As a result, the animated figure and the prop may have a more desirable (e.g., a more pristine, a less worn) appearance, and/or maintenance operations or services may be performed less frequently to mitigate the wear. In this manner, the show effect system may improve how a show effect is provided to the guests. Indeed, the techniques described herein to present such a show effect to the guests may enhance the experience provided by the attraction system without significantly increasing a cost and/or complexity associated with manufacture, installation, and/or operation of the show effect system. For example, incorporation of certain control system capabilities, such as accurate and/or precise motion control of each individual show effect element to move in close proximity of one another to emulate contact driven movement of the show effect elements may be avoided. In this manner, the systems and methods described herein may be more readily implemented in the attraction system.

With the preceding in mind, FIG. 1 is a schematic diagram of an embodiment of an attraction system 50. The attraction system 50 may include a guest area 52 where one or more guests of the attraction system 50 may be positioned. As an example, the guest area 52 may include a path (e.g., a walkway, a queue, a line) through which a guest may navigate. As another example, the guest area 52 may include a space (e.g., a seating area) where a guest may be positioned to view a performance. As a further example, the guest area 52 may include a ride vehicle that may move and carry a guest throughout the attraction system 50.

Furthermore, the attraction system 50 may include a show effect system 54 that may provide entertainment to guests. For example, the show effect system 54 may be visible from the guest area 52 and may therefore entertain a guest positioned in the guest area 52. The show effect system 54 may include an animated FIG. 56, such as a robot, which may be movable. For instance, the animated FIG. 56 may have a humanoid profile with a limb that may be movable relative to a torso of the animated FIG. 56. By way of example, the show effect system 54 may include an actuator 58 configured to drive movement of a portion of the animated FIG. 56. The attraction system 50 may include a control system 60 (e.g., an automation controller, a programmable logic controller, an electronic controller), which may be a part of the show effect system 54. The control system 60 may include multiple controllers, which may be configured to operate different aspects of the attraction system 50, such as components of the show effect system 54, other show effect systems of the attraction system 50, a ride vehicle of the attraction system 50, components of other attraction systems, and so forth. For example, the control system 60 may be communicatively coupled to the actuator 58 and may control operation of the actuator 58 to drive movement of the animated FIG. 56. The control system 60 may include a memory 62 and processing circuitry 64. The memory 62 may include volatile memory, such as random access memory (RAM), and/or non-volatile memory, such as read-only memory (ROM), optical drives, hard disc drives, solid-state drives, or any other non-transitory computer-readable medium that includes instructions. The processing circuitry 64 may be configured to execute such instructions. For example, the processing circuitry 64 may include one or more application specific integrated circuits (ASICs), one or more field programmable gate arrays (FPGAs), one or more general purpose processors, or any combination thereof.

During operation of the attraction system 50, the control system 60 may operate the actuator 58 to move the animated FIG. 56. Movement of the animated FIG. 56 may entertain the guests at the guest area 52, such as by providing a realistic appearance that the animated FIG. 56 is interacting with the guests. In one embodiment, the control system 60 may operate the actuator 58 based on a predetermined, preset, or pre-programmed manner. For example, the control system 60 may output a control signal that instructs the actuator 58 to drive movement of the animated FIG. 56 at a particular time stamp (e.g., when the guests and/or the guest area 52 are at a particular location relative to the animated FIG. 56), at a particular frequency (e.g., every cycle of operation of the attraction system 50), and/or based on any other suitable parameter. Additionally, or alternatively, the control system 60 may operate the actuator 58 in response to a user input or interaction. For example, the control system 60 may be configured to receive the user input via a sensor or an interface and may operate the actuator 58 based on the received user input. To this end, the control system 60 may be configured to detect a parameter associated with the guest area 52, such as guest movement within the guest area 52.

Furthermore, the actuator 58 may cause movement of a responder, follower, or secondary prop 66. For example, the actuator 58 may drive movement of a movable component 68 (e.g., a prop component, a translatable component, a rotatable component) of the responder prop 66. In an embodiment, movement of the movable component 68 may be caused by a force imparted onto the movable component 68. For instance, the responder prop 66 may remain passive or idle (e.g., the movable component 68 may be static or stationary) until the force is imparted to drive movement of the movable component 68. However, it may not be desirable for a force to be imparted on a certain part of the movable component 68 to move the movable component 68. For example, a first portion of the movable component 68 may be visible to the guests from the guest area 52. Thus, a force imparted on the first portion of the movable component 68, such as via a collision or direct engagement between the animated FIG. 56 and the first portion of the movable component 68, may cause wear (e.g., on the animated FIG. 56, on the first portion of the movable component 68) that may be visible to the guests from the guest area 52. The visible wear may reduce the show effect experience provided to the guests and/or may prompt performance of a maintenance operation or service to mitigate the wear and maintain the show effect experience provided to the guests. Thus, the visible wear may negatively impact operation of the attraction system 50.

For this reason, operation of the actuator 58 may cause a force to be imparted on a second portion of the movable component 68 to cause movement of the movable component 68, and the second portion may not be visible to guests from the guest area. As an example, the second portion of the movable component 68 may be at least partially concealed, shrouded, or otherwise obscured from the perspective of the guests from the guest area 52. Thus, wear of the second portion of the movable component 68 (e.g., caused by the imparted force) may not be visible to the guests. As such, the show effect experience provided to the guests may be maintained, and/or fewer service or maintenance operations may be performed to mitigate the wear. Therefore, the operation of the attraction system 50 may be improved. Moreover, the show effect system 54 may operate to portray that movement of the movable component 68 appears to be caused by a force imparted by the animated FIG. 56. For example, movement of the movable component 68, as caused by a force imparted on the second portion of the movable component 68, may appear to be caused by a force imparted by the animated FIG. 56 on the first portion of the movable component 68. In this manner, the show effect system 54 may provide a realistic appearance that the animated FIG. 56 is causing movement of and interacting with the responder prop 66 without causing wear that may be visible to the guests from the guest area 52.

In an embodiment, the actuator 58 may drive movement of a linkage system 70 of the show effect system 54, and the linkage system 70 may be configured to cause movement of the animated FIG. 56 and/or the responder prop 66. As an example, a part of the animated FIG. 56 may be coupled to or secured to the linkage system 70, and movement of the linkage system 70 may cause movement of the part of the animated FIG. 56. For instance, movement of the linkage system 70 may cause the animated FIG. 56 to move relative to the responder prop 66 (e.g., the first portion of the responder prop 66 visible to the guests). Furthermore, movement of the linkage system 70 may cause the linkage system 70 to engage the responder prop 66 (e.g., the second portion of the responder prop 66 obscured from visibility to the guests). Movement of the linkage system 70 while in engagement with the responder prop 66 may impart a force onto the responder prop 66 to cause movement of the responder prop 66.

In one embodiment, movement of the linkage system 70 may initially cause the animated FIG. 56 to move adjacent to the responder prop 66 and cause the linkage system 70 to come into engagement with the responder prop 66. Further movement of the linkage system 70 while in engagement with the responder prop 66 may cause concurrent movement of the animated FIG. 56 and of the responder prop 66. The concurrent movement of the animated FIG. 56 and the responder prop 66 caused by the linkage system 70 may block contact between the animated FIG. 56 and the responder prop 66. Thus, wear that may otherwise be caused by contact between the animated FIG. 56 and the responder prop 66 may be avoided. Moreover, the concurrent movement of the animated FIG. 56 and the responder prop 66 while the animated FIG. 56 is in close proximity of the responder prop 66 may portray that the animated FIG. 56 is causing the movement of the responder prop 66, such as via contact or collision between the animated FIG. 56 and the responder prop 66. That is, although the linkage system 70 is driving movement of each of the animated FIG. 56 and the responder prop 66, movement of the animated FIG. 56 appears to cause corresponding movement of the responder prop 66. As such, the show effect system 56 may provide the appearance that the responder prop 66 is being moved by the animated FIG. 56 without causing the animated FIG. 56 to come into contact with the responder prop 66.

The linkage system 70 may be obscured from view by the guests from the guest area 52. For example, the responder prop 66 may include an enclosure 72 (shown in phantom lines in FIGS. 2 and 3), such as a shelf-like support, having an internal volume that is not visible from the guest area. At least a portion of the linkage system 70 may extend into the internal volume and therefore may not be visible to the guests. The engagement between the linkage system 70 and the animated FIG. 56 and/or between the linkage system 70 and the movable component 68 may also be obscured. As an example, the linkage system 70 may be engaged with the movable component 68 at an interface within the enclosure 72, and the interface therefore may not be visible from the guest area 52. As another example, the guest area 52 may be positioned with respect to the show effect system 54 such that a sightline from the guest area 52 to the linkage system 70 may be obscured. For instance, a portion of the animated FIG. 56 may block or shield viewing of the engagement between the linkage system 70 and the animated FIG. 56 and/or of the engagement between the linkage system 70 and the movable component 68 from the guest area 52. As a further example, the appearance of the linkage system 70 may blend in with the responder prop 66 and/or the animated FIG. 56. For instance, a color of the linkage system 70 may correspond to or match a color of the responder prop 66 and/or of the animated FIG. 56. Additionally, or alternatively, a texture or surface of the linkage system 70 may correspond to or match that of the responder prop 66 and/or of the animated FIG. 56. As such, the linkage system 70 may be camouflaged or cloaked and may not be distinguishable from the responder prop 66 and/or the animated FIG. 56. Thus, the guests may not easily notice or see the linkage system 70.

The show effect system 54 may further include other show effects, such as audio effects 74 (e.g., music, sound effects) and/or visual effects 76 (e.g., a video, lighting, smoke effects), that may be provided to the guests at the guest area 52. Such effects may further enhance the show effect experience provided to the guests. For instance, the effects may complement or supplement the appearance of the animated FIG. 56 and of the responder prop 66, such as by providing a sound effect that further portrays the animated FIG. 56 as driving movement of the responder prop 66. Additionally, or alternatively, the other effects provided by the show effect system 54 may further obscure the linkage system 70. As an example, reduced lighting of the animated FIG. 56, of the responder prop 66, and/or of the linkage system 70 may reduce visibility of the linkage system 70. As another example, fog, mist, smoke, and/or other substances (e.g., fluidized material) may be emitted (e.g., between the guest area 52 and the show effect system 54) to reduce visibility of the linkage system 70. In an embodiment, the control system 60 may operate the show effect system 54 to control operation of the audio effects 74 and/or the visual effects 76. For example, the control system 60 may operate the audio effects 74 and/or the visual effects 76 based on operation of the show effect system 54 (e.g., movement of the animated FIG. 56, the responder prop 66, and/or the linkage system 70). Thus, the audio effects 74 and/or the visual effects 76 may improve the experience provided via the attraction system 50.

Figure 2:
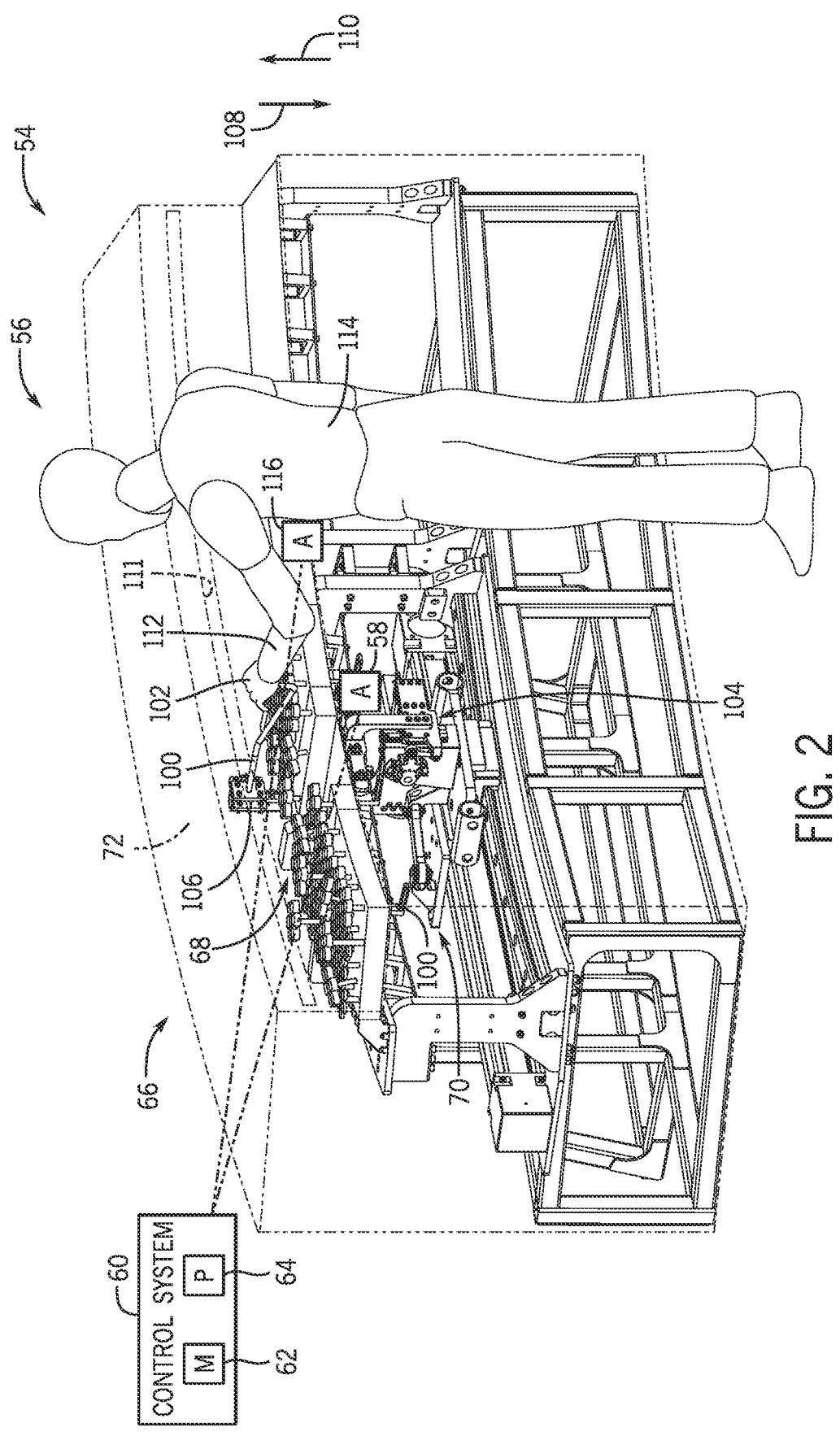
FIG. 2 is a perspective view of an embodiment of a show effect system of an attraction system, in accordance with an aspect of the present disclosure.

FIG. 2 is a perspective view of an embodiment of the show effect system 54. The show effect system 54 may include the animated FIG. 56, which has a humanoid profile in the illustrated embodiment, but could alternatively include an animalistic profile or any suitably shaped figure. Furthermore, the show effect system 54 may include the responder prop 66, which has a collection of flower-like props (e.g., a flower bed) in the illustrated embodiment. The responder prop 66 may include the enclosure 72 (e.g., a housing, body, or case). The linkage system 70, such as an extension 100 (e.g., a rod) of the linkage system 70, may be coupled to, attached to, or secured to the animated FIG. 56, such as to a hand 102 of the animated FIG. 56. The actuator 58 may be configured to drive movement of the linkage system 70, and movement of the linkage system 70 may drive movement of the animated FIG. 56. Thus, the actuator 58 may cause movement of the animated FIG. 56 via the linkage system 70.

Furthermore, the linkage system 70 may be configured to engage the movable component 68 and cause movement of the movable component 68. As an example, the linkage system 70 may include a contactor system 104, and the actuator 58 may be configured to drive movement of the contactor system 104. Sufficient movement of the contactor system 104 may place the contactor system 104 in engagement with the movable component 68 to impart a force onto the movable component 68 and drive movement of the movable component 68. In this manner, movement of the linkage system 70 may cause both movement of the animated FIG. 56 and of the movable component 68. Indeed, the hand 102 of the animated FIG. 56 may be moved adjacent to the movable component 68, and then the hand 102 may be moved in conjunction with the movable component 68 to portray that movement of the movable component 68 is driven by movement the hand 102. For example, the movable component 68 may include a flower, and concurrent movement of the animated FIG. 56 and of the movable component 68 may portray that the hand 102 of the animated FIG. 56 is colliding with and imparting a force onto the movable component 68 to press and move the flower. It should be noted that the show effect system 54 may include any suitable number of movable components 68, such as one movable component 68, two movable components 68, or three or more movable components 68, and the linkage system 70 may be configured to drive movement of each of the movable components 68. The movable components 68 may have different sizes, different shapes or profiles, and/or different positionings relative to one another.

In an embodiment, the extension 100 may be coupled to a support 106 of the linkage system 70, and the support 106 may be coupled to the contactor system 104. The actuator 58 may be configured to drive movement of the contactor system 104, and movement of the contactor system 104 may drive movement of the support 106. Movement of the support 106 may then drive movement of the extension 100 and therefore of the hand 102 coupled to the extension 100. Such movement of the contactor system 104 may also cause a portion of the contactor system 104 to engage and impart a force onto the movable component 68 and drive movement of the movable component 68. By way of example, the actuator 58 may drive the linkage system 70 and therefore the contactor system 104 to move in a first direction 108 (e.g., downwardly) and contact a portion of the movable component 68 to cause the portion of the movable component 68 to move in the first direction 108. Additionally, movement of the linkage system 70 in the first direction 108 may cause movement of the support 106, of the extension 100, and therefore of the hand 102 in the first direction 108. For instance, the linkage system 70 may cause the hand 102 to approach or become proximate to the movable component 68 to portray that the hand 102 is coming into contact with the movable component 68 to cause movement of the movable component 68. When movement of the linkage system 70 causes the hand 102 to move within a threshold distance away from the movable component 68, the contactor system 104 may come into engagement with the movable component 68, and the linkage system 70 may cause concurrent movement between the movable component 68 and the hand 102 to maintain an offset (e.g., the threshold distance) between the hand 102 and the movable component 68. Accordingly, the linkage system 70 may block direct engagement between the animated FIG. 56 and the movable component 68 to avoid wear that would otherwise be caused by contact between the animated FIG. 56 and the movable component 68.

Further, movement of the linkage system 70 and therefore the contactor system 104 in a second direction 110 (e.g., upwardly), opposite the first direction 108, may reduce a force imparted by the contactor system 104 onto the movable component 68 and/or disengage the contactor system 104 from the movable component 68. The reduced force imparted onto the movable component 68 and resultant disengagement between the contactor system 104 and the movable component 68 may cause the portion of the movable component 68 to move in the second direction 110. Movement of the contactor system 104 in the second direction 110 may also cause movement of the support 106, of the extension 100, and of therefore the hand 102 in the second direction 110, such as to cause concurrent movement of the hand 102 and the movable component 68 and further portray that movement of the movable component 68 is caused by movement of the hand 102. Further movement of the linkage system 70 in the second direction 110 may cause the contactor system 104 to disengage from the movable component 68 and move the hand 102 away from the movable component 68. That is, movement of the linkage system 70 while the contactor system 104 is not in engagement with the movable component 68 may cause movement of the hand 102 without moving the movable component 68. Thus, the linkage system 70 may cause relative movement between the hand 102 and the movable component 68 while the contactor system 104 is not in engagement with the movable component 68. The hand 102 may be positioned at a distance greater than the threshold distance away from the movable component 68 while the contactor system 104 is disengaged from the movable component 68. In this manner, the linkage system 70 may cause movement of the movable component 68 via the contactor system 104 while the hand 102 is adjacent to the movable component 68, and the linkage system 70 may not cause movement of the movable component 68 via the contactor system 104 while the hand 102 is positioned farther away from the movable component 68 to provide an appearance that the hand 102 contacts the movable component 68 to move the movable component 68.

In an additional or alternative embodiment, movement of the linkage system 70 and the contactor system 104 in the second direction 110 may cause the contactor system 104 to engage with the movable component 68 and impart a force that drives movement of the movable component 68. In such an embodiment, movement of the linkage system 70 and the contactor system 104 in the first direction 108 may reduce the force imparted by the contactor system 104 onto the movable component 68 and/or disengage the contactor system 104 from the movable component 68. Furthermore, movement of the linkage system 70 in other directions, such as directions (e.g., lateral directions) crosswise to the directions 108, 110, may cause the contactor system 104 to engage with and disengage from the movable component 68 to drive movement of the movable component 68.

In an embodiment, the extension 100 may be at least partially positioned within the internal volume of the enclosure 72 (e.g., the extension 100 may extend into and out of the internal volume via an opening, a gap, or a void 111 of the enclosure 72), and at least a portion of the support 106 may be positioned within the enclosure 72. As such, the support 106 may not be visible to the guests of the attraction system. Furthermore, the extension 100 may have approximately the same color (e.g., a dark hue) and/or texture (e.g., surface texture) as a portion of the enclosure 72, such as a portion of the enclosure 72 (e.g., a molding, an applied strip, a natural coloring) overlapping with the extension 100 based on a perspective or sightline of the guests, to blend the extension 100 in with the enclosure 72, thereby obscuring the visibility of the extension 100. Thus, guests may not see the extension 100 and, instead, may see the hand 102 as moving freely relative to the responder prop 66. Similarly, in one embodiment, the contactor system 104 may be positioned in the enclosure 72 and therefore may not be visible to the guests. In an additional or alternative embodiment, the contactor system 104 may also be approximately the same color and/or texture (e.g., surface texture, surface covering) as the enclosure 72 to blend the contactor system 104 in with the enclosure 72 and obscure the visibility of the contactor system 104. For instance, a black or other dark colored cover (e.g., a fabric, such as a velvet material) may be applied onto the linkage system 70 (e.g., a portion of the linkage system 70, such as the extension 100, overlapping the opening 111) and/or the enclosure 70 (e.g., the portion of the enclosure 72 overlapping with the extension 100). The dark colored cover may match the coloring of the linkage system 70 and the enclosure 70 with one another and/or increase absorption of light to obscure the appearance of the linkage system 70 with respect to the enclosure 72, the opening 111, and/or a scenery or environment in which the show effect system 54 is implemented. In addition, the cover applied to the enclosure 70 may span the opening 111 to increase opacity, obscurity, and concealment of the internal volume of the enclosure 72 and further obscure the appearance of the linkage system 70. Further still, the hand 102 may be coupled to an arm 112 of the animated FIG. 56, and the arm 112 may be movable relative to a torso 114 of the animated FIG. 56. Movement of the hand 102, as caused by the linkage system 70, may cause movement of the arm 112 (e.g., relative to the torso 114) and provide a realistic appearance of movement of the animated FIG. 56 to portray the hand 102 as a freely moving part of the animated FIG. 56.

Additionally, or alternatively, the perspective of the guests with respect to the show effect system 54 may obscure visibility of the linkage system 70 by interrupting the sightline between the guest area 52 and the show effect system 54 in order to portray that the animated FIG. 56 is contacting the movable component 68 to drive movement of the movable component 68. By way of example, the arm 112 and/or the torso 114 may interrupt a sightline from the guest area 52 to at least a portion of the hand 102 (e.g., the fingers) and obscure the visibility of a position of the hand 102 relative to the movable component 68. To this end, the guest area 52 may be at an elevated position with respect to the show effect system 54 (e.g., at a threshold height above the movable component 68, the hand 102, the arm 112, and/or the torso 114) and/or such that the arm 112 and/or the torso 114 is positioned between the hand 102 and the guest area 52. In this manner, the precise positioning between the hand 102 and the movable component 68 (e.g., the offset between the hand 102 and the movable component 68, the coupling between the hand 102 and the extension 100) may not be noticeable to the guests. Moreover, another portion of the show effect system 54, such as movement of another arm of the animated FIG. 56 and/or movement of the torso 114 (e.g., caused by another actuator 116 communicatively coupled to the control system 60), may divert the attention of the guests. Thus, the guests may not focus on whether the hand 102 causes movement of the movable component 68. As a result, the appearance that movement of the animated FIG. 56 imparts a force to move the movable component 68 may be more realistically portrayed.

Figure 3:
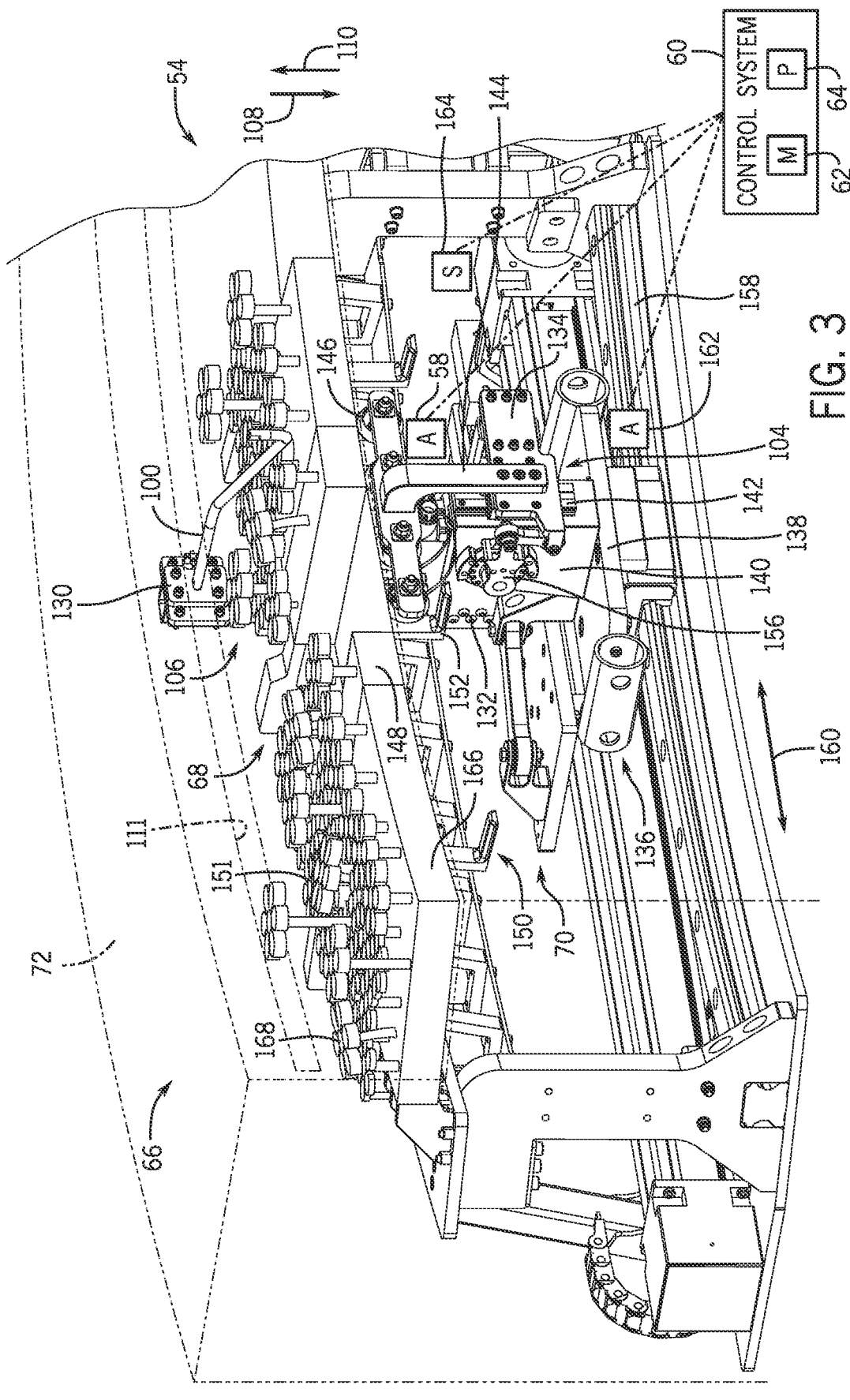
FIG. 3 is a perspective view of an embodiment of a show effect system of an attraction system, in accordance with an aspect of the present disclosure.

FIG. 3 is a perspective view of an embodiment of the show effect system 54 having the multiple movable components 68 and the linkage system 70. The animated figure is not shown in the illustrated embodiment to facilitate visualization of the show effect system 54. The support 106 of the linkage system 70 may include a first plate 130 to which the extension 100 may be coupled. The support 106 may also include a bracket system 132 to which the first plate 130 may be coupled. The bracket system 132 may extend along and/or about the movable components 68, and a second plate 134 of the support 106 may be coupled to the bracket system 132. The second plate 134 may also be movably coupled to a base 136 of the linkage system 70. For example, the base 136 may include a pedestal 138 and a stand 140 coupled to the pedestal 138. A first rail 142 may be coupled to the stand 140, and the second plate 134 may be coupled to the first rail 142. The second plate 134 may be configured to translate along the first rail 142, such as in the first direction 108 and in the second direction 110. Furthermore, relative movement between the extension 100, the first plate 130, the bracket system 132, and the second plate 134 may be blocked. Thus, movement of the second plate 134 may cause corresponding movement of the extension 100, such as to move the hand of the animated figure in the first direction 108 and in the second direction 110.

Moreover, a beam 144 of the contactor system 104 may be coupled to the second plate 134, and a press 146 of the contactor system 104 may be coupled to the beam 144. The press 146 may be configured to contact one or more of the movable components 68 to drive movement of the movable component(s) 68. By way of example, each movable component 68 may include a first section or piece 148 (e.g., a primary section, a non-contact section, a lever) that may be coupled to a second section or piece 150 (e.g., a secondary section, a contact section). The first section 148 may be coupled to (e.g., fixedly coupled to) or include a visible piece 151 (e.g., a portion, an attachment), such as a set of flowers, that are positioned external to the enclosure 72 (shown in phantom lines) of the responder prop 66 such that the visible piece 151 is visible to the guests. However, visibility of a portion of the first section 148 (e.g., parts of the first section 148 that do not include the visible piece 151) may be obscured (e.g., the color and/or texture of the first section 148 may blend into the color and/or texture of the enclosure 72 and/or of the surrounding environment or scenery) to portray that the visible piece 151 is free standing and that movement of the visible piece 151 is caused by contact with the animated FIG. 56 instead of by being mechanically driven via another device (e.g., the linkage system 70). In addition, a significant portion of the second section 150 may be disposed within the enclosure 72 and may therefore be concealed to the guests.

Each second section 150 may include a first protrusion or projection 152 with which the press 146 may make contact. The press 146 may be configured to engage and impart a force onto the second section 150 to move the second section 150. Movement of the second section 150, as caused by the force imparted via the press 146, may also cause movement of the first section 148. For instance, movement of the second plate 134 along the first rail 142 in the first direction 108 may drive the press 146 toward one of the first protrusions 152 and move the hand of the animated figure toward the first section 148 (e.g., toward the visible piece 151). Continued movement of the second plate 134 and therefore of the linkage system 70 in the first direction 108 may cause continued movement of the hand in the first direction 108 and may also cause the press 146 to contact and drive movement of the second section 150 and therefore of the attached first section 148 (e.g. in the first direction 108). Thus, the movable component 68 may move in conjunction with the hand to avoid contacting the hand. As an example, movement of the second plate 134 in the first direction 108 may cause the hand to move within a threshold distance (e.g., within 5 centimeters, within 3 centimeters, within 1 centimeter, within 0.5 centimeters, within 0.1 centimeters) of the first section 148 to portray to the guests that the hand is in contact with the first section 148. Further movement of the second plate 134 in the first direction 108 while the hand is within the threshold distance of the first section 148 (e.g., of the visible piece 151) may cause the hand and the first section 148 (e.g., the visible piece 151) to move in conjunction with one another to portray to the guests that the hand is imparting a force onto the first section 148 and/or the visible piece 151 to cause movement of the movable component(s) 68. However, movement of the movable component(s) 68 may actually be caused via engagement between the press 146 and the second section 150 rather than contact between the hand and the first section 148.

Furthermore, movement of the second plate 134 along the first rail 142 in the second direction 110 may reduce the force imparted by the press 146 onto the first protrusion 152. Reducing the force imparted by the press 146 onto the first protrusion 152 may cause movement of the second section 150 in the second direction 110, thereby causing the attached first section 148 (e.g., the visible piece 151) to move in the second direction 110 as well. Continued movement of the second plate 134 and therefore of the linkage system 70 may cause continued movement of the hand in the second direction 110 and may cause the press 146 to disengage from the second section 150. Movement of the second plate 134 while the press 146 is not in engagement with the second section 150 may cause relative movement between the hand and the movable component 68. For example, the hand may be moved away from the movable component 68 to be beyond the threshold distance away from the first section 148. Thus, movement of the second plate 134 while the hand is outside of the threshold distance from the first section 148 may not cause movement of the movable component 68, and movement of the second plate 134 while the hand is within the threshold distance from the first section 148 may cause movement of the movable component 68.

The actuator 58 may drive movement of the second plate 134 along the first rail 142. For example, the second plate 134 may be coupled to a connector system 156, and the connector system 156 may be coupled to the actuator 58. During operation, the actuator 58 may be configured to move the connector system 156, thereby driving movement of the second plate 134 along the first rail 142. For instance, the connector system 156 may include a set of gears, links, and/or pivots that may be configured to move (e.g., rotate, translate) about one another during operation of the actuator 58 to cause the second plate 134 to move along the first rail 142. As such, operation of the actuator 58 may cause movement of the linkage system 70 to drive movement of animated figure and/or of the movable component(s) 68.

In one embodiment, the base 136 may also be configured to move in one or more directions that are crosswise (e.g., perpendicular) to the first direction 108 and the second direction 110 in order to move the linkage system 70 (e.g., the extension 100) and/or the animated figure (e.g., the hand of the animated figure) crosswise to the first direction 108 and the second direction 110. By way of example, the pedestal 138 may be configured to move along a second rail 158, which may extend along (e.g., underneath) the movable components 68. For instance, the pedestal 138 may translate in lateral directions 160 (e.g., horizontal directions) along the second rail 158, and movement of the pedestal 138 in the lateral directions 160 may cause the linkage system 70 and therefore the hand of the animated figure to move along the movable components 68. Indeed, such movement of the pedestal 138 along the lateral directions 160 may cause the hand to align with a different movable component 68 and cause the press 146 to align with a different corresponding second section 150 of the movable component 68. Movement of the second plate 136 along the first rail 142 may then cause the press 146 to engage with and move the different corresponding second section 150 and cause movement of the associated movable component 68 (e.g., instead of movement of a previous movable component 68 with which the press 146 was formerly aligned). In this manner, cooperative movement of the pedestal 138 along the second rail 158 and movement of the second plate 134 along the first rail 142 may enable the hand of the animated figure to appear to move different sets of the movable component 68 to increase a realistic portrayal of interaction between the animated figure and the responder prop 66.

An additional actuator 162 of the show effect system 54 may be used to move the base 136 along the second rail 158 and to position the linkage system 70 and therefore the hand of the animated figure with the corresponding movable component(s) 68. For example, the additional actuator 162 may also be communicatively coupled to the control system 60. In an embodiment, the control system 60 may be configured to control the actuator 58 and/or the additional actuator 162 based on data received from a sensor 164. As an example, the sensor 164 may include a position sensor (e.g., a proximity sensor, an optical sensor, an inductive sensor, a hall effect sensor, an accelerometer, a gyroscope, an inertial measurement unit, an electro-mechanical sensor, an electro-magnetic sensor). The control system 60 may determine a target position associated with the linkage system 70 and/or associated with the hand of the animated figure, such as based on a user input and/or a pre-programmed operation, and the control system 60 may operate the actuator 58 and/or the additional actuator 162 based on data received from the sensor 164 to move the linkage system 70 and/or the hand toward the target position. The control system 60 may additionally or alternatively operate the actuator 58 and/or the additional actuator 162 based on other types of data received from the sensor 164, such as time, a parameter associated with the guest area (e.g., whether guests are in range of the show effect system 54), and so forth. Indeed, the control system 60 may operate the actuator 58 and/or the additional actuator 162 based on data received from the sensor 164 in order to control the show effect system 54 more desirably to provide a show effect experience to the guests.

At least a portion of the support 106, such as the first plate 130, the bracket system 132, and/or the second plate 134, may be disposed within the enclosure 72 of the responder prop 66 in order to conceal the portion of the support 106 and portray that movement of the movable component 68 is caused by direct contact with the animated figure instead of by contact with the linkage system 70. In an embodiment, the base 136 and/or the second section 150 of the movable component 68 may also be disposed within the enclosure 72 to conceal the linkage system 70 and further portray that movement of the movable component 68 is caused by contact with the animated figure. Additionally, or alternatively, multiple parts, such as the first plate 130, the bracket system 132, the second plate 134, the pedestal 138, the stand 140, the first rail 142 may be of the same or a similar color and/or texture, such as a color and/or texture of the enclosure 72 (e.g., including a cover spanning the opening 111 through which the extension 100 extends), to blend such parts in with one another and/or the enclosure 72 and reduce visibility of the parts. Thus, the show effect system 54 may more realistically portray that the animated figure is directly causing movement of the movable component 68. Since the engagement between the linkage system 70 and the movable component 68 may be concealed from the guests, wear of components (e.g., the press 146, the first protrusion 152) caused by such engagement may not be noticeable. Thus, maintenance operations to mitigate the wear may be performed less frequently, and the show effect system 54 may operate more efficiently to entertain the guests.

In an embodiment, the responder prop 66 may also include an immovable component 166 with an additional visible piece 168 that is similar to the visible piece 151 of the movable component 68. A position of the immovable component 166 and the additional visible piece 168 may remain stationary or fixed during operation of the show effect system 54. For example, the contactor system 104 may not contact the immovable component 166, and the animated figure may not contact the additional visible piece 168 of the immovable component 166. Additionally, visibility of the immovable component 166 may be obscured from the guests, but the additional visible piece 168 may be visible to the guests. The positioning of the visible piece 151 of the movable component 68 relative to the additional visible piece 168 of the immovable component 166 may help portray realistic movement of the visible piece 151 relative to the stationary position of the additional visible piece 168. For example, movement of the linkage system 70 may cause the animated figure to appear to contact the visible piece 151 of the movable component 68, but not the additional visible piece 168 of the immovable component 166. The movement of the linkage system 70 may also cause the contactor system 104 to drive movement of the visible piece 151 but not movement of the additional visible piece 168. As such, the linkage system 70 may portray that the animated figure is specifically causing movement of the visible piece 151, and not the additional visible piece 168, by appearing to directly contact the visible piece 151. Thus, the immovable component 166 and the additional visible piece 168 may further increase a realistic appearance of the visible piece 151. Although the illustrated embodiment includes the movable components 68 and the immovable components 166 as having multiple visible pieces 151, 168, respectively, in an additional or alternative embodiment, the movable components 68 may have a single visible piece 151 and/or the immovable component 166 may have a single additional visible piece 168. Indeed, the show effect system 54 may include any suitable number of visible pieces 151, 168 positioned in any manner with respect to the movable components 68 and the immovable components 166.

Figure 4:
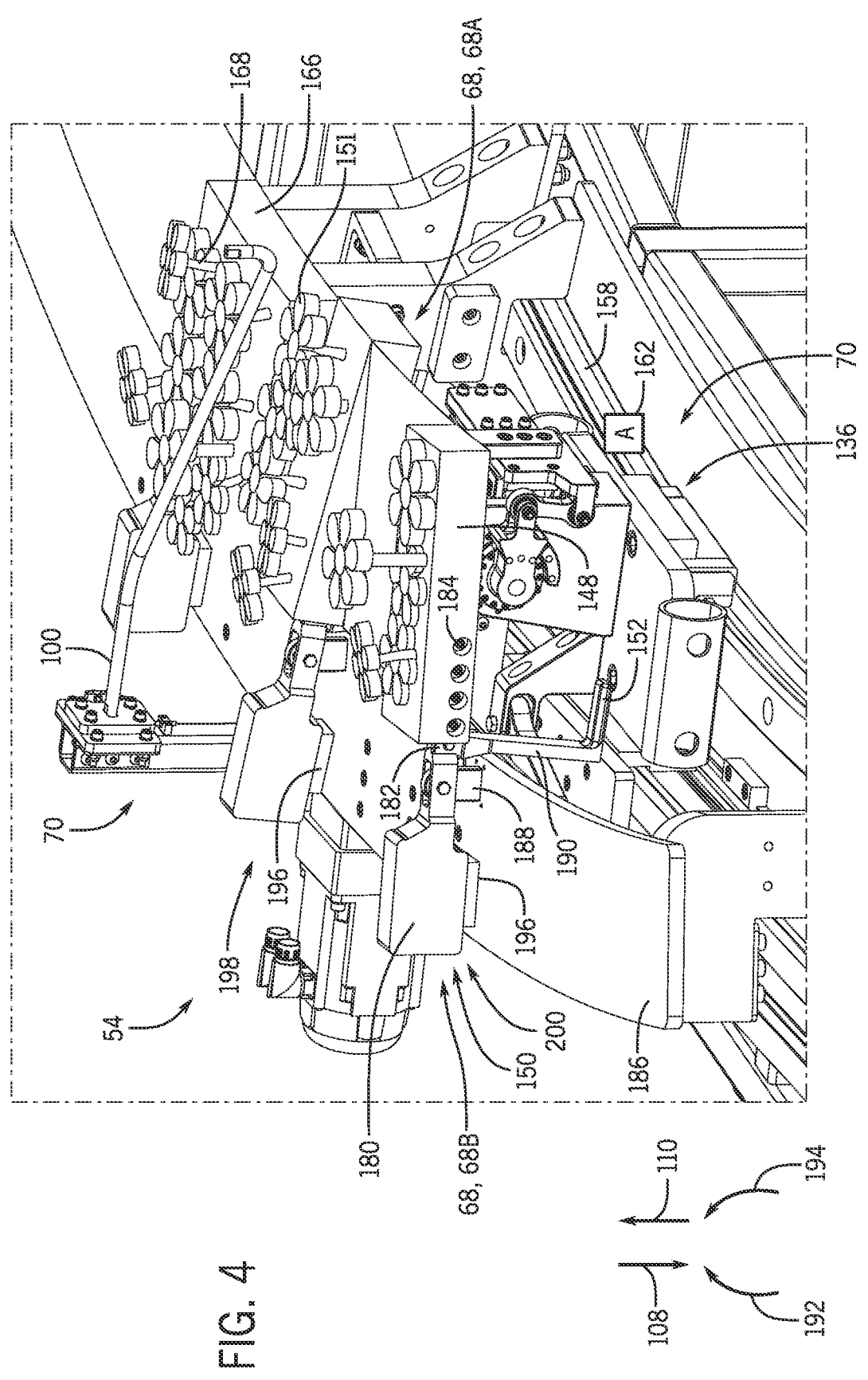
FIG. 4 is a detailed perspective view of an embodiment of a show effect system of an attraction system, in accordance with an aspect of the present disclosure.

FIG. 4 is a detailed perspective view of an embodiment of the show effect system 54, with certain features (e.g., one of the immovable components 166) removed to help further illustrate the movable components 68. For example, each second section 150 of the movable components 68 may include a head 180 and a second protrusion or projection 182 extending from the head 180. The second protrusion 182 may extend or insert into a corresponding first section 148 of the movable component 68, and the first section 148 may be secured to (e.g., via fasteners 184 extending through the first section 148 and the second protrusion 182) the second protrusion 182 to couple the first section 148 and the second section 150 to one another. Indeed, the first section 148 (along with the visible piece 151) and the second section 150 may be fixedly coupled to one another such that movement of the second section 150 causes corresponding movement of the first section 148.

Additionally, the show effect system 54 may include a platform 186, which may remain stationary or fixed during operation of the show effect system 54. The immovable components 166 may be fixedly coupled to the platform 186 to block movement of the immovable components 166 about the platform 186. However, the movable component 68 may be movably coupled to the platform 186. For example, a hinge 188 of the show effect system 54 may be coupled to the platform 186, and the movable component 68 may be pivotably coupled to the hinge 188. For example, the second protrusion 182 of the second section 150 may be coupled to the hinge 188, and the second protrusion 182 may be configured to rotate about the hinge 188, thereby causing the first section 148 (e.g., the visible piece 151) and the second section 150 to rotate relative to the platform 186.

The rotation of the movable component 68 may be driven via a force imparted onto the second section 150. For instance, the second section 150 may include a segment 190 extending from the second protrusion 182, and the first protrusion 152 may extend from the segment 190. In a coupled configuration of the movable component 68 in which the movable component 68 is coupled to the hinge 188, the segment 190 may extend (e.g., downwardly) between the platform 186 and the first section 148 such that the first protrusion 152 may be positioned to enable the linkage system 70 (e.g., the press 146 of FIG. 3) to contact the first protrusion 152. Indeed, while the movable component 68 is in the coupled configuration, the linkage system 70 may align with the first protrusion 152 (e.g., via operation of the additional actuator 162 to move the base 136 along the second rail 158). The linkage system 70 may then impart a force onto the first protrusion 152 to cause movement of the movable component 68. By way of example, a force imparted by the linkage system 70 onto the first protrusion 152 in the first direction 108 may cause the first protrusion 152 and the segment 190 to move in the first direction 108, thereby causing the second section 150 and therefore the first section 148 (e.g., the visible piece 151) to rotate about the hinge 188 in a first rotational direction 192.

Reducing the force imparted onto the first protrusion 152 in the first direction 108 may cause the first protrusion 152 and the segment 190 to move in the second direction 110, thereby causing the second section 150 and therefore the first section 148 to rotate about the hinge 188 in a second rotational direction 194, opposite the first rotational direction 192. For example, the movable component 68 may include a weight 196 coupled to the head 180, and the weight 196 may impart a force onto the head 180 in the first direction 108 that urges the movable component 68 to rotate in the second rotational direction 194 (e.g., while the force imparted onto the first protrusion 152 is reduced), such as until the weight 196 is in engagement with the platform 186, and/or blocks rotation of the movable component 68 in the first rotational direction 192. In this manner, engagement between the linkage system 70 and the movable component 68 may impart a force onto the first protrusion 152 that counteracts or overcomes the force imparted by the weight 196 onto the head 180 to cause the movable component 68 to rotate in the first rotational direction 192. However, an insufficient force imparted onto the first protrusion 152 (e.g., due to a reduced engagement between the linkage system 70 and the movable component 68) may enable the force imparted by the weight 196 onto the head 180 to move the weight 196 toward the platform 186, thereby rotating the movable component 68 in the second rotational direction 194.

As illustrated in FIG. 4, the linkage system 70 (e.g., the press 146 of FIG. 3) is in engagement with a first movable component 68A to rotate the first movable component 68A in the first rotational direction 192, thereby transitioning the first movable component 68A to an actuated or engaged configuration 198. However, the linkage system 70 may not be in engagement with a second movable component 68B, and the second movable component 68B may therefore be in an unactuated, disengaged, or default configuration 200. By way of example, a force may be imparted onto the first protrusion 152 of the first movable component 68A to cause the first movable component 68A to rotate in the first rotational direction 192, but a force may not be sufficiently imparted on the first protrusion 152 of the second movable component 68B to cause the weight 196 of the second movable component 68B to engage the platform 186.

Rotation of the movable component 68 in the first rotational direction 192 may also block contact between the movable component 68 and the extension 100 and also between the movable component 68 and the animated figure (e.g., the hand of the animated figure). Indeed, as described herein, initial movement of the linkage system 70 (e.g., movement of the press 146 of FIG. 3 toward the first protrusion 152) may move the extension 100 and the hand of the animated figure toward the movable component 68 to position the hand adjacent to the first section 148 (e.g., to the visible piece 151) of the movable component 68. However, further movement of the linkage system 70 may cause the linkage system 70 to engage the first protrusion 152 and cause the movable component 68 to rotate in the first rotational direction 192 about the platform 186. For example, although the linkage system 70 may continue to move the extension 100 and the hand of the animated figure in the first direction 108, the linkage system 70 may concurrently cause the movable component 68 to rotate in the first rotational direction 192 while the linkage system 70 is in engagement with the first protrusion 152, thereby causing the first section 148 to move in the first direction 108. For instance, engagement between the linkage system 70 and the movable component 68 may cause the first section 148 and the hand of the animated figure to move in parallel with one another to block contact between the first section 148 (e.g., the visible piece 151) and the hand. That is, the hand may remain proximate to the first section 148 during the parallel movement of the first section 148 and the hand to portray that the hand appears to remain in contact with the first section 148 (e.g., the visible piece 151) and is causing rotation of the movable component 68 in the first rotational direction 192.

In an additional or alternative embodiment, the linkage system 70 may be configured to drive different movement of the movable component 68, such as to a different actuated configuration and/or unactuated configuration. As an example, the linkage system 70 may be configured to cause the movable component 68 to twist (e.g., rotate about a different pivot or hinge). As another example, the linkage system 70 may be configured to cause the movable component 68 to translate (e.g., in vertical directions, in lateral directions) in addition to or as an alternative to causing the movable component 68 to rotate. Indeed, the linkage system 70 may cause any suitable motion of the movable component 68 to portray a realistic appearance of movement caused by direct contact with the animated figure.

Figure 5:
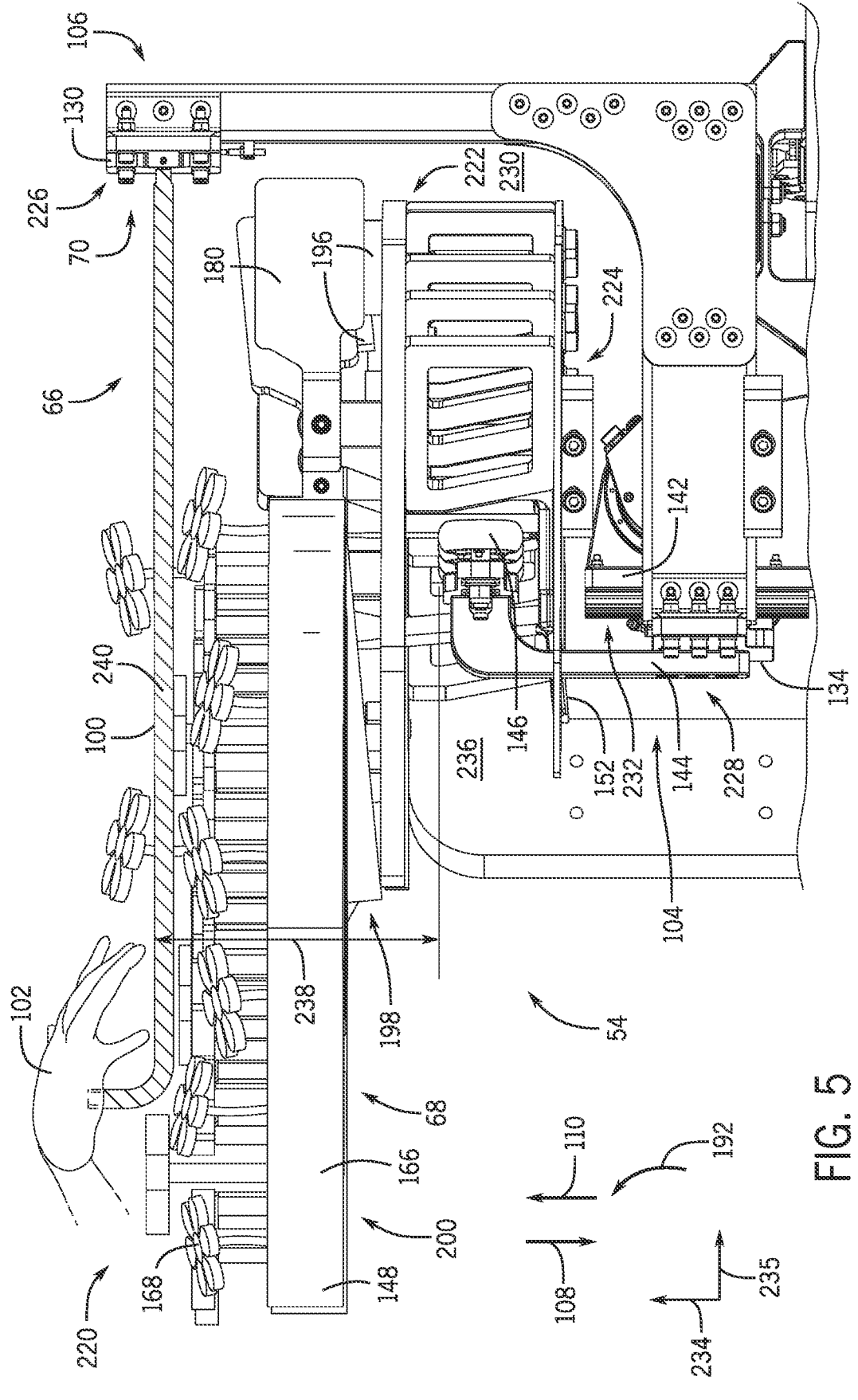
FIG. 5 is a side view of an embodiment of a show effect system of an attraction system, in accordance with an aspect of the present disclosure.

FIG. 5 is a side view of an embodiment of the show effect system 54. Certain components (e.g., the enclosure 72) of the show effect system 54 are not shown to help visualize the linkage system 70 with respect to the movable components 68. In the illustrated embodiment, the extension 100 is positioned at a first side 220 (e.g., a top side) of the movable components 68, such as above the heads 180. The support 106 may be positioned at a second side 222 (e.g., a rear side) of the movable components 68, such as at least partially within the enclosure of the responder prop 66. The support 106 may also extend along a third side 224 (e.g., a bottom side) of the movable components 68, such as below the first protrusions 152. To this end, the support 106 may include an L-shape or J-shape having a first end 226 and a second end 228. The first plate 130 may be coupled to the first end 226, and the first end 226 may be positioned relative to the movable components 68 such that the extension 100 coupled to the first plate 130 is clear (e.g., extends above) of the movable components 68. In this manner, the extension 100 and the support 106 may cooperatively form a first channel or space 230 in which the movable components 68 may be positioned. That is, the ends 226, 228 may be positioned at opposite sides of the movable components 68, and the movable components 68 may be positioned between the extension 100 and the second end 228 of the support 106.

The second plate 134 may be coupled to the second end 228, and the second end 228 may be positioned relative to the movable components 68 such that the beam 144 is clear (e.g., is offset from) the first protrusions 152. As such, the beam 144 may not come into contact with the movable component 68. However, the beam 144 may extend crosswise to and past the first protrusion 152, and the beam 144 may position the press 146 to align with one of the first protrusions 152 about a vertical axis 234 (e.g., the press 146 and the first protrusion 152 are positioned along the same vertical axis, the press 146 and the first protrusion 152 overlap along a horizontal axis 235). For example, the support 106, the beam 144, and the press 146 may cooperatively form a second channel or space 232 in which the first protrusion 152 may be positioned. The positioning of the first protrusion 152 within the second channel 232 may enable the press 146 to engage the first protrusion 152 in response to movement of the support 106 in the first direction 108 (e.g., movement of the second plate 134 along the first rail 142).

Furthermore, the press 146 may be positioned within a third channel or space 236 cooperatively formed by the first section 148 and the second section 150 of the movable component 68 (e.g. spanning between the first protrusion 152 and the first section 148). Movement of the linkage system 70 relative to the movable component 68 may cause the press 146 to move within the channel 236. For instance, movement of the press 146 within the third channel 236 without engaging the movable component 68 (e.g., the first protrusion 152) may enable movement of the hand 102 of the animated figure without moving the movable component 68. As an example, movement of the linkage system 70 in the second direction 110 while the press 146 is not in engagement with the movable component 68 may cause the hand 102 to raise without causing rotation of the movable component 68. Thus, the linkage system 70 may enable a range of motion of the animated figure, such as while the hand 102 is not within the threshold distance of the first section 148, in which the movable component 68 does not move.

Engagement between the press 146 and the first protrusion 152 (e.g., caused by sufficient movement of the linkage system 70 in the first direction 108) may cause movement of the movable component 68. For example, the movable component 68 may be rotated in the first rotational direction 192 to transition into the actuated configuration 198. Additionally, the hand 102 may be positioned adjacent to the movable component 68 during transition of the movable component 68 to the actuated configuration 198 so as to portray that the hand 102 is in contact with the movable component 68 to rotate first movable component 68. For example, a portion of the hand 102 and/or the extension 100 may be positioned at level with the movable components 68 that are in the unactuated configuration 200 and/or in between immovable components 166. However, since the linkage system 70 may cause both the hand 102 and the movable component 68 to move in conjunction with one another, the hand 102 may not contact the movable component 68 (e.g., the hand 102 and the extension 100 may remain above the first section 148, including the visible piece 151). Indeed, movement of the second plate 134 along the first rail 142 may cause the extension 100 and the hand 102 to move in addition to causing the press 146 to move, and movement of the press 146 may drive corresponding movement of the movable component 68. Thus, an offset distance 238 (e.g., a vertical offset distance) between the press 146 and the hand 102 may maintain a corresponding offset between the hand 102 and the first section 148.

Furthermore, a cover 240, such as a dark (e.g., black, blue, purple) colored fabric, may be applied onto the extension 100 to facilitate concealment of the extension 100, such as to increase absorption of light at the extension 100 and/or blend the extension 100 (e.g., via color matching) with a portion of the enclosure. For example, there may be reduced or limited lighting provided in the surrounding environment or scenery of the show effect system 54 to reduce visibility of an entirety of the show effect system 54, and the cover 240 may further reduce visibility of the extension 100 with respect to the surrounding environment. The cover 240 and/or an additional, similar cover may be applied to other elements of the show effect system 54, such as the first plate 130 and/or the opening of the enclosure, to reduce visibility of such elements.

Figure 6:
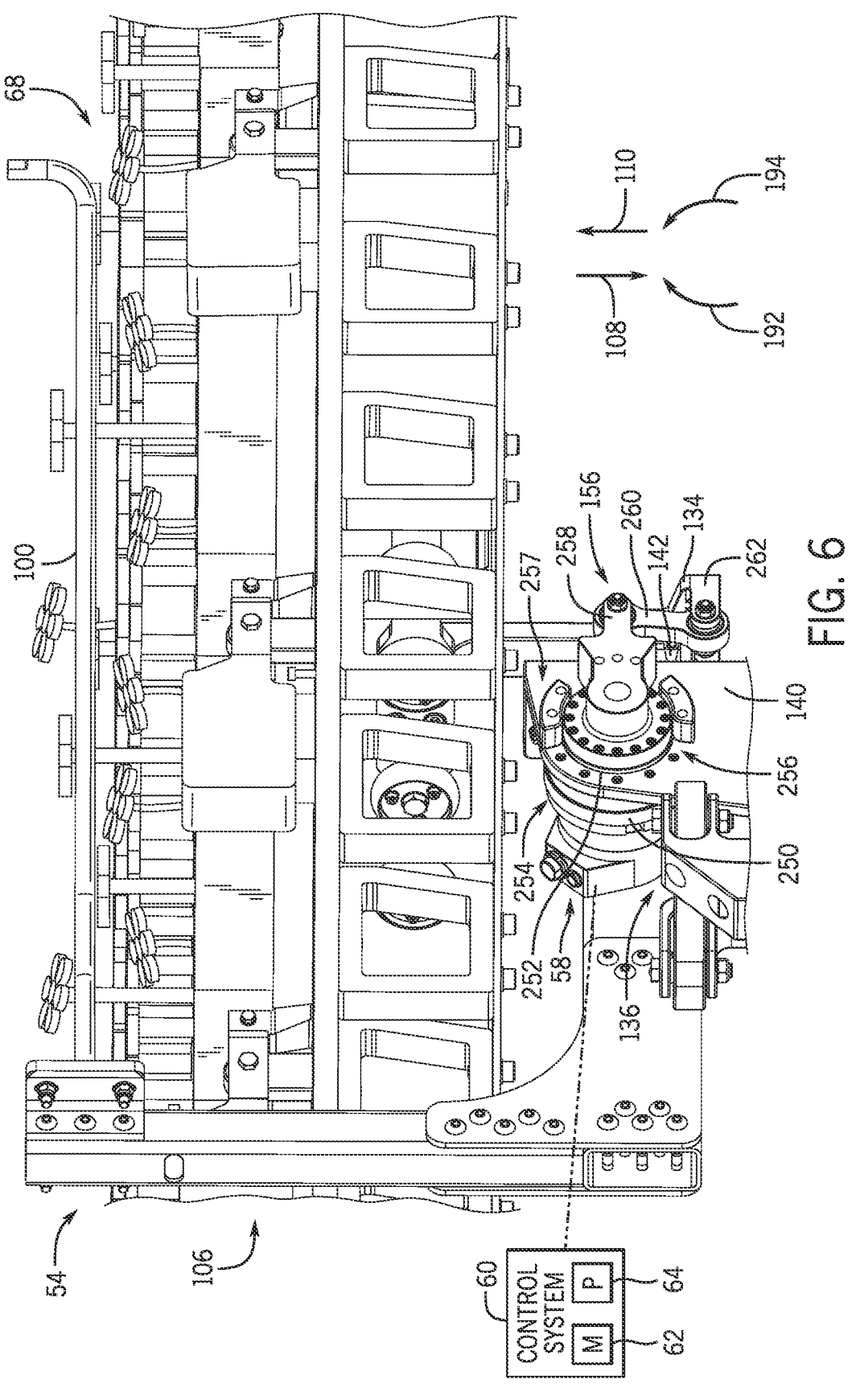
FIG. 6 is a perspective view of an embodiment of a show effect system of an attraction system, in accordance with an aspect of the present disclosure.

FIG. 6 is a perspective view of the show effect system 54 in which certain components are not shown for visualization purposes. The actuator 58 may include a motor (e.g., an electromechanical motor, a hydraulic motor) and a gearbox (e.g., a harmonic drive). For example, the actuator 58 may include a mount 250 (e.g., a housing, a casing, a circular spline) that may be fixedly coupled to the stand 140 to secure the actuator 58 to the base 136. The actuator 58 may also include a rotator 252 (e.g., a shaft, a gear, a flexible spline) rotatably coupled to the mount 250. Thus, the rotator 252 may be configured to rotate relative to the mount 250 and/or the stand 140. For instance, during operation of the actuator 58, a torque may be transmitted to cause the rotator 252 to rotate. The connector system 156 may be coupled to the rotator 252 to enable rotation of the rotator 252 to move the connector system 156.

In the illustrated embodiment, the mount 250 is coupled to a first side 254 of the stand 140, the rotator 252 extends through an opening 256 of the stand 140 to a second side 257 of the stand 140, and the rotator 252 is coupled to a first link 258 of the connector system 156 at the second side 257. Rotation of the rotator 252 may drive rotation of the first link 258. In addition, the first link 258 may be rotatably coupled to a second link 260 of the connector system 156, and the second link 260 may be rotatably coupled to the second plate 134 (e.g., a flange 262 of the second plate 134). Rotation of the rotator 252 may drive movement of the first link 258 and of the second link 260, and movement of the second link 260 may drive movement of the second plate 134 relative to the first rail 142 to cause the support 106 to move (e.g., relative to the movable components 68). By way of example, in order to move the support 106 in the first direction 108 (e.g., to engage the movable component 68), the actuator 58 may drive the rotator 252 and therefore the first link 258 to rotate in the first rotational direction 192 about the stand 140 and the mount 250, thereby driving the second plate 134 to move in the first direction 108 along the first rail 142. Moreover, in order to move the support 106 in the second direction 110 (e.g., to disengage from the movable component 68), the actuator 58 may drive the rotator 252 and therefore the first link 258 to rotate in the second rotational direction 194 about the stand 140 and the mount 250, thereby driving the second plate 134 to move in the second direction 110 along the first rail 142. The control system 60 may be configured to operate the actuator 58 to cause the rotator 252 to rotate in the first rotational direction 192 and the second rotational direction 194 to control a position of the extension 100 and the animated figure with respect to the movable component 68.

In an additional or alternative embodiment, the actuator 58 may drive movement of the support 106 and the extension 100 using a different technique. For instance, the actuator 58 may include a linear actuator configured to cause the second plate 134 to translate in the first direction 108 and the second direction 110 along the first rail 142 to drive corresponding movement of the support 106 and the extension 100. Indeed, the actuator 58 and/or the connector system 156 may operate in any suitable manner to move the extension 100 and the animated figure to portray that the animated figure is contacting the movable component 68 to cause movement of the movable component 68.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A show effect system of an amusement park attraction, the show effect system comprising:
   an animated figure;
   a prop component; and
   a linkage system comprising an extension, a contactor system, and a support, wherein the extension is directly coupled to the animated figure, a first end of the support is directly coupled to the extension, and a second end of the support is directly coupled to the contactor system, wherein the linkage system is configured to:
      move the contactor system relative to the prop component to move the extension, the support, and the animated figure toward the prop component and to cause engagement between the contactor system and the prop component;
      cause the prop component to move, via the engagement between the contactor system and the prop component, in conjunction with the extension, the support, and the animated figure; and
      block direct contact between the prop component and the extension, the prop component and the support, and the prop component and the animated figure via the engagement between the contactor system and the prop component.

2. The show effect system of claim 1, wherein the contactor system is configured to move during the engagement between the contactor system and the prop component, and wherein the contactor system comprises a press configured to engage with a portion of the prop component to move the prop component in a movement direction.

3. The show effect system of claim 2, wherein the prop component comprises a weight configured to block the prop component from moving in the movement direction during disengagement between the press of the contactor system and the prop component.

4. The show effect system of claim 1, wherein the extension and the support cooperatively form a channel, the prop component is disposed in the channel, and wherein a visibility of the extension is obscured via visual blending of the extension with other aspects of the show effect system.

5. The show effect system of claim 1, comprising a motor coupled to the linkage system, wherein operation of the motor drives movement of the linkage system.

6. The show effect system of claim 1, comprising an enclosure, wherein the prop component is external to the enclosure, and the extension extends into the enclosure.

7. The show effect system of claim 1, wherein the prop component is a first prop component, the show effect system comprises a second prop component, the linkage system is configured to move to align with the second prop component, and the linkage system is configured to move relative to the second prop component to cause engagement between the contactor system and the second prop component instead of the first prop component to cause the second prop component to move while aligned with the second prop component.

8. An attraction system of an amusement park, the attraction system comprising:
  a prop component comprising a first section and a second section;
  an extension;
  an animated figure directly coupled to the extension;
  a contactor system comprising a press configured to engage with the second section of the prop component; and
  a support directly coupled to the extension and to the contactor system, wherein the support extends between the contactor system and the extension and is configured to:
    move relative to the prop component to move the contactor system, the extension, and the animated figure toward the first section of the prop component until the press of the contactor system engages the second section of the prop component; and
    move while the press of the contactor system is in engagement with the second section of the prop component to cause concurrent movement of the component and the animated figure to avoid direct contact between the prop component and the animated figure, the prop component and the extension, and the prop component and the support.

9. The attraction system of claim 8, comprising a base and an actuator, wherein the support is coupled to the base, and the actuator is configured to move the support along the base.

10. The attraction system of claim 9, wherein the actuator is configured to:
    cause the contactor system to move in a first direction along the base to move the animated figure toward the first section of the prop component until the press of the contactor system engages the second section of the prop component; and
    cause the contactor system to move in a second direction, opposite the first direction, along the base to move the animated figure away from the first section of the prop component and to disengage the press of the contactor system from the second section of the prop component.

11. The attraction system of claim 8, wherein the first section of the component and the second section of the prop component cooperatively form a channel, the press of the contactor system is positioned within the channel, and movement of the support relative to the prop component causes the press to move within the channel.

12. The attraction system of claim 8, wherein a visibility of the second section of the prop component is obscured, the second section of the prop component comprises a protrusion, and the support is configured to move to cause the press to engage the protrusion and move the prop component.

13. The attraction system of claim 11, wherein the support is configured to move the animated figure without moving the prop component by moving the press within the channel relative to the prop component.

14. The attraction system of claim 8, comprising an enclosure, wherein the extension extends into an internal volume of the enclosure via an opening of the enclosure, the contactor system and/or the support are at least partially disposed within the internal volume of the enclosure, and the attraction system comprises a dark cover applied onto the extension and/or the enclosure to conceal the extension and/or the internal volume of the enclosure.

15. The attraction system of claim 8, comprising a guest area, wherein a portion of the animated figure is positioned between the guest area and a coupling of the extension to the animated figure to interrupt a sightline from the guest area to the coupling of the extension to the animated figure.

16. The attraction system of claim 8, comprising an actuator and a controller communicatively coupled to the actuator, wherein the controller is configured to perform operations comprising:
    operating the actuator to move the support and cause the animated figure to move toward the first section of the prop component and cause the contactor system to engage the second section of the prop component; and
    operating the actuator to move the support while the contactor system is in engagement with the second section to cause the concurrent movement of the prop component and the animated figure.

17. A method of operating an attraction system of an amusement park, the method comprising:
    moving, via movement of a linkage system coupled to an animated figure, the animated figure, a contactor system of the linkage system, a support of the linkage system, and an extension of the linkage system toward a movable prop component of an attraction system, wherein the extension is directly coupled to the animated figure, a first end of the support is directly coupled to the extension, and a second end of the support is directly coupled to the contactor system;
    engaging, via the movement of the linkage system, the contactor system with the movable prop component; and
    causing, via the movement of the linkage system during engagement between the contactor system and the movable prop component, movement of the movable prop component in conjunction with movement of the animated figure, the support, and the extension to block direct contact between the animated figure and the movable prop component, the extension and the movable prop component, and the support and the movable prop component.

18. The method of claim 17, wherein the contactor system is coupled to an actuator, and moving the animated figure via the linkage system comprises instructing the actuator to cause movement of the contactor system to drive movement of the support and the extension coupled to the animated figure.

19. The method of claim 17, comprising:
    disengaging, via the movement of the linkage system, the contactor system from the movable prop component; and
    moving, via the movement of the linkage system and while the contactor system is disengaged from the movable prop component, the animated figure away from the movable prop component.

20. The method of claim 17, comprising:
    causing, via movement of the linkage system in a first direction during the engagement between the contactor system and the movable prop component, movement of the movable prop component in a first direction; and
    causing, via movement of the linkage system in a second direction during the engagement between the contactor system and the movable prop component, movement of the movable prop component in a second direction, opposite the first direction.

* * * * *